US011178950B2

(12) United States Patent
Zhijian (10) Patent No.: US 11,178,950 B2
(45) Date of Patent: Nov. 23, 2021

(54) LUGGAGE/BAG WITH AN INCOMING CALL REMINDING FUNCTION (71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 0 days.

(21) Appl. No.: 17/176,216

(22) Filed: Feb. 16, 2021

(65) Prior Publication Data

US 2021/0161267 A1 Jun. 3, 2021

Related U.S. Application Data (63) Continuation-in-part of application No. 16/301,821, filed as application No. PCT/CN2017/082342 on Apr. 28, 2017.

(30) Foreign Application Priority Data

May 23, 2016 (CN) .......................... 201610346106.6

(51) Int. Cl.
| | |
|---|---|
| *H04M 1/00* | (2006.01) |
| *A45C 13/28* | (2006.01) |
| *A45C 3/06* | (2006.01) |
| *A45C 13/24* | (2006.01) |
| *A45F 3/04* | (2006.01) |
| *A45C 5/03* | (2006.01) |

(Continued)

(52) U.S. Cl.
CPC ................ *A45C 13/28* (2013.01); *A45C 3/06* (2013.01); *A45C 5/03* (2013.01); *A45C 13/24* (2013.01); *A45F 3/04* (2013.01); *G08B 6/00* (2013.01); *G08B 21/24* (2013.01); *H04M 1/72412* (2021.01); *H04M 3/02* (2013.01); *A45F 2003/003* (2013.01); *H04M 2250/02* (2013.01)

(58) Field of Classification Search
CPC ....... A45C 13/001; A45C 13/28; A45C 13/30; H04W 4/80; H04M 1/72597; H04R 1/1083; H04N 21/4821; G06K 19/0702
USPC ............................ 455/41.1–41.3; 379/387.01
See application file for complete search history.

(56) References Cited

U.S. PATENT DOCUMENTS

| 9,770,084 B1 * | 9/2017 | Shiekh | ................... A45C 13/28 |
| 2008/0156885 A1 * | 7/2008 | Landau | .............. G06K 19/0702 |
| | | | 235/492 |

(Continued)

FOREIGN PATENT DOCUMENTS

| CN | 201508414 U | * | 6/2010 | ............. G01S 19/19 |
| CN | 201533641 U | * | 7/2010 | ............. A45C 15/00 |
| WO | WO-9959313 A1 | * | 11/1999 | ............. G08B 6/00 |

*Primary Examiner* — Md S Elahee
(74) *Attorney, Agent, or Firm* — Jennifer Meredith, Esq.; Meredith Attorneys, PLLC (57) ABSTRACT A handbag, backpack or luggage with an incoming call reminding function, comprising: an incoming call reminding device equipped inside a handle of the handbag and used for sensing an incoming call signal of a mobile phone nearby and reminding by vibrating. The incoming call reminding device having a battery, mainboard, vibration motor and a cable, wherein the vibration motor receives the signal transmitted by the mainboard and vibrates to alert when the mobile phone has an incoming call. There may be at least one cavity (which may be in an inner padding material) and holds the incoming call reminding device inside of a handle or backpack strap. The vibration motor, mainboard and battery may be placed separately and substantially in a line, to keep in a narrow space inside of the handle or strap.

29 Claims, 6 Drawing Sheets (51) Int. Cl.
*H04M 1/72412* (2021.01)
*G08B 21/24* (2006.01)
*G08B 6/00* (2006.01)
*H04M 3/02* (2006.01)
*A45F 3/00* (2006.01)

(56) References Cited

U.S. PATENT DOCUMENTS

2015/0281794 A1* 10/2015 Choi ................. H04N 21/4821
　　　　　　　　　　　　　　　　　　　725/40
2016/0330541 A1* 11/2016 Miao .................... H04R 1/1083

* cited by examiner

LUGGAGE/BAG WITH AN INCOMING CALL REMINDING FUNCTION

TECHNICAL FIELD

The invention relates to a luggage/bag with an incoming call reminding function, in particular to a luggage/bag with a Bluetooth incoming call reminding function.

BACKGROUND ART

When going out, people usually put their mobile phones in backpacks or handbags, and it is easy to miss calls because of the noisy outdoor environment. Although the incoming call reminding function has been widely used currently, it is mainly concentrated on watches and smart bracelets, and its use is greatly limited. In addition, the difficulty of retrieving the lost luggages/bags is also a problem that plagues consumers at present. Therefore, it is a matter of urgency to introduce a luggage/bag with an incoming call reminding function that is convenient for people to go out and can effectively prevent theft and being quickly retrieved.

CONTENT OF THE INVENTION

In order to overcome the shortcomings of the existing luggage/bag not having the incoming call reminding function, the present invention provides a luggage/bag with an incoming call reminding function, which has an excellent incoming call reminding function without affecting the appearance of the luggage/bag, and is convenient to use.

The technical solution of the present invention is as follows: In order to realize the vibration reminder of the incoming calls, an incoming call reminding device is equipped in the handle or the shoulder strap of the applied luggage/bag with an incoming call reminding function, for sensing the incoming call signal of the mobile phone in the luggage/bag and achieving the reminding effect by vibration; the incoming call reminding device comprises: A battery used for supplying power to the mainboard; A mainboard used for sensing the incoming call signal of the mobile phone in the luggage/bag and causing the vibration motor to vibrate to make an incoming call reminder; A cable used for connecting the vibration motor to the battery and the mainboard respectively; A vibration motor used to receive the signal transmitted by the mainboard and vibrate to make a reminder when the mobile phone in the luggage/bag has an incoming call. In order to make the incoming call reminding device more compact and not affecting the aesthetics of the luggage/bag, the mainboard is provided with a Bluetooth chip for receiving an incoming call signal of the mobile phone in the luggage/bag sensed by the crystal oscillator; A crystal oscillator used for sensing an incoming call signal of the mobile phone in the luggage/bag and transmitting the signal to the Bluetooth chip; An electrically erasable read-only memory used for storing a program of the Bluetooth chip; A power switch used for controlling whether or not to power the Bluetooth chip.

In order to better sense the vibration effect, the vibration motor is located at a position on the handle or shoulder strap that is in contact with the human body when the luggage/bag is used.

In order to know the working state of the incoming call reminding device in real time, the said mainboard is further provided with a Led light connected to the Bluetooth chip, and the Led light is used for receiving a signal transmitted by the Bluetooth chip and prompting the working state of the incoming call reminding device by blinking.

In order to reduce the volume of the incoming call reminding device, the main components are highly integrated inside the Bluetooth chip, and the said Bluetooth chip comprises:

A memory for storing operation information of the microcontroller;

A baseband chip for receiving a signal transmitted by the receiving device/balun filter and converting the signal to the microcontroller; A receiving device/balun filter used for receiving and processing an incoming call signal of the mobile phone in the luggage/bag sensed by the crystal oscillator and transmitting the signal to the baseband chip; A microcontroller used for controlling the power manager, the vibration motor, and the I/O interface to receive and process signals transmitted by the baseband chip and the I/O interface and to store the running information on the memory when running; A power manager used for receiving a control signal transmitted by the microcontroller and the power switch to control the on/off and voltage and circuit size of the battery to the Bluetooth chip; An I/O interface used for connecting an electrically erasable read-only memory and a Led light.

In order to facilitate external charging and subsequent development of extended functions, the mainboard is further provided with: A keyboard input interface for an external keyboard to send commands to the microcontroller through the I/O interface; A serial peripheral interface for externally connecting the serial device, receiving the control signal from the microcontroller or transmitting a signal to the microcontroller.

A charging interface used for the external power supply device to supply power to the Bluetooth chip and that is controlled by the power manager.

In order to locate the position of the luggage/bag in real time, the mainboard is further provided with a GPS locator for providing GPS position information to the microcontroller. In order to prevent the luggages/bags from losing and the timely retrieval of a lost luggage/bag, the said mainboard is further provided with an alarm for receiving the position information transmitted by the GPS locator, when the position information exceeds the program parameter set up in the alarm, the alarm will be given.

Compared with the prior art, the present invention has the following advantages:
1) After the incoming call reminding device is installed on the backpack shoulder strap or handbag, the consumer can sense the incoming call in the first time and will not miss the call because the mobile phone is placed in the bag;
2) There is no need to add additional parts, it does not affect the original shape of the luggage/bag, and it is reasonable and compact in structure and easy to use;
3) It is easy to use by flashing the light to indicate the working status;
4) Both battery and the external charging are used to ensure the normal operation of the incoming call reminding device;
5) The alarm and GPS locator locate the position of the luggage/bag in real time, and can automatically alarm when it is stolen, which is safe and reliable.

SPECIFIC EMBODIMENTS

Figure 1:
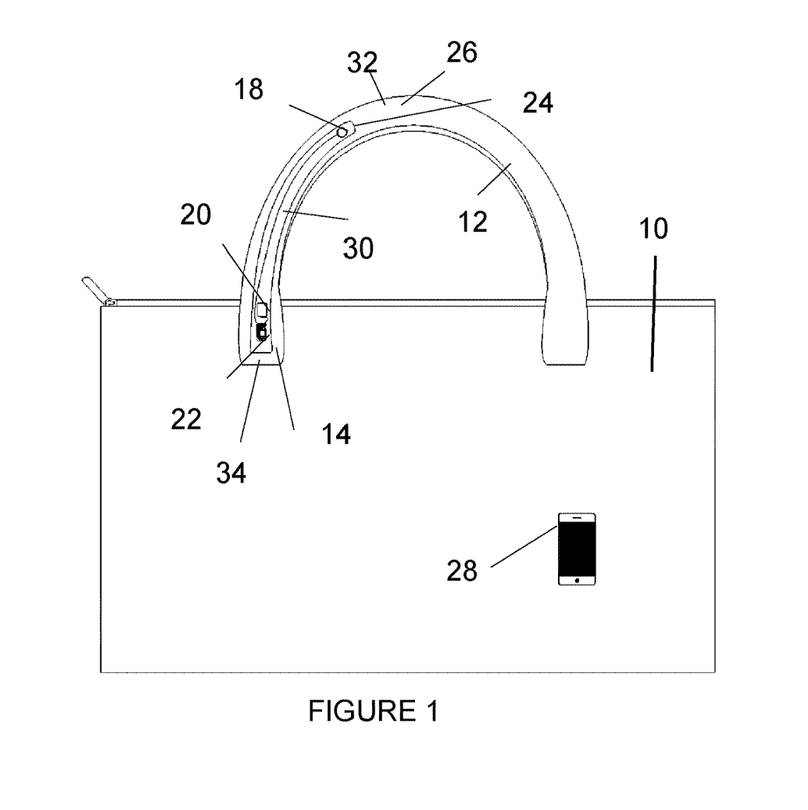
FIG. 1 is a front view according to one aspect of the present invention.
Figure 2:
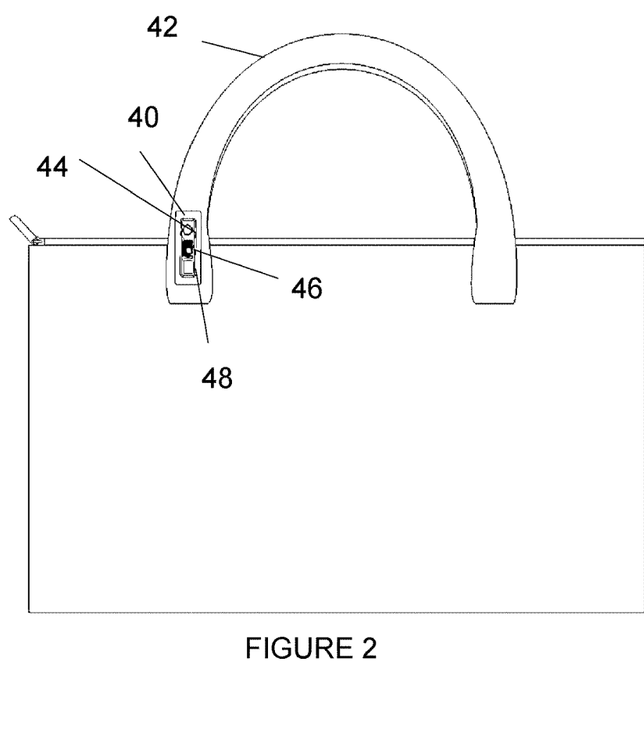
FIG. 2 is a front view according to one aspect of the present invention.
Figure 3:
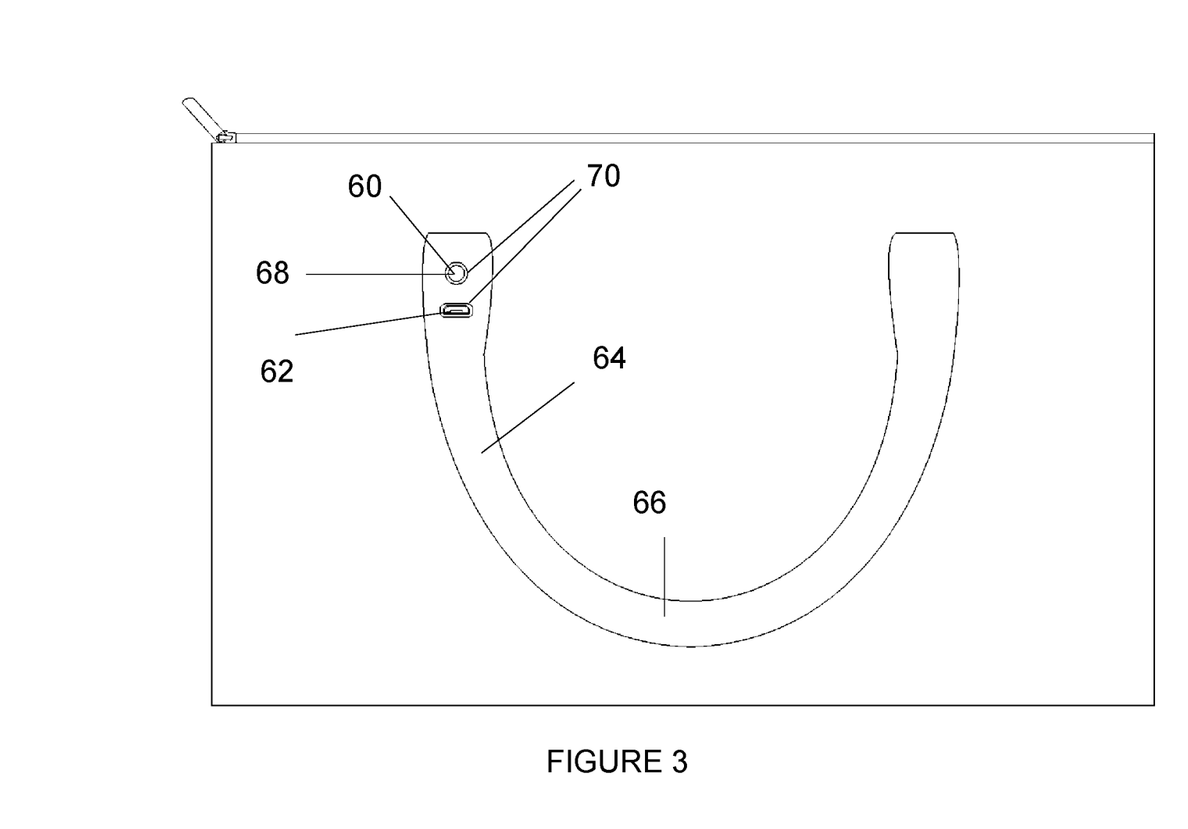
FIG. 3 is a front view according to one aspect of the present invention.
Figure 6:
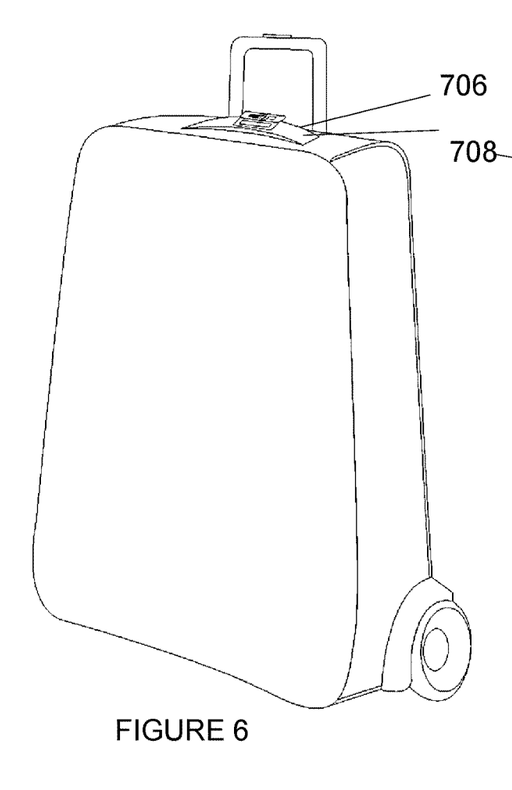
FIG. 6 is a front view of a suitcase according to one aspect of the present invention.
Figure 7:
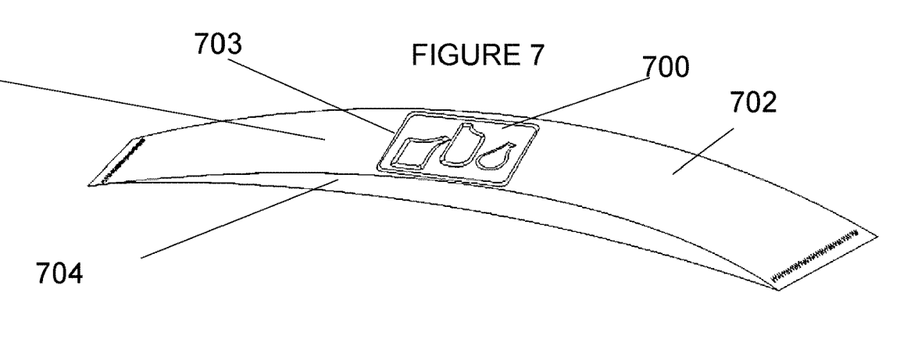
FIG. 7 is a close up of a holder according to one aspect of the present invention.
Figure 8:
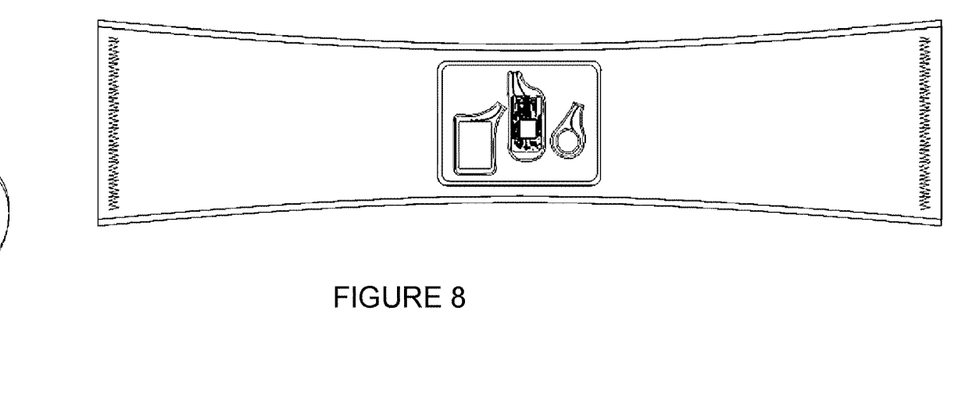
FIG. 8 is a top view of a holder according to one aspect of the present invention.

The present invention provides a handbag, backpack and/or luggage that includes an incoming call reminding function. As shown in FIGS. 1, 2 and 3 a bag (10) with a handle (12) is provided. There is an incoming call reminding device (14) equipped inside a handle (12) of the handbag (10) and used for sensing an incoming call signal of a mobile phone (28) nearby and reminding by vibrating. The incoming call reminding device comprises: a battery (20) used for supplying power to a mainboard (22) and a vibration motor (18). The mainboard (22) is used for sensing the incoming call signal of the mobile phone (28) which may be in the handbag or nearby and causes a vibration motor (18) to vibrate to make an incoming call reminder. As shown in FIG. 1, there may be at least one cable (30) used for connecting the mainboard (22) to the vibration motor (18) and the battery (20). This allows for the incoming call reminding device to be retained inside an elongated portion of a bag, such as a handle. The vibration motor (18) receives the signal transmitted by the mainboard (22) and vibrates to alert when the mobile phone (18) has an incoming call. As shown in FIGS. 6, 7 and 8, the handle (706) of the handbag may have an outer surface (708) wrapping an inner padding material (704), the inner padding material having at least one cavity (703) to hold the incoming call reminding device inside of the handle. According to one embodiment, the vibration motor (18), mainboard (22) and battery (20) are placed separately and substantially in a line, to keep in a narrow space inside of the handle. The vibration motor (18) may be located away from the mainboard (22) and stays in the cavity located at the end which is near the top end (32) of the handle. The mainboard (22) and battery (20) are located at the lower area (34), while the vibration motor (18) is at the opposite end, but connected by a length of cable (30) in the cavity (24). According to one embodiments, the distance between the mainboard, vibration motor and battery is at least 1 mm and the length of cable is longer than 2 mm. This offers a loose space, allowing the vibration motor and mainboard to bend flexibly. The longer length of cable offers a loose space, allowing the vibration motor, battery and mainboard to be yielding flexibly and keeping the cable intact when user carrying the handbag. The term "cavity" may refer to both a "through hole" and "an indentation." FIG. 2 depicts an outer surface (42) having a cavity (40) with a vibration motion (44), mainboard (46) and a battery (48) contained in the cavity.

FIG. 3 depicts the mainboard comprises a Bluetooth chip, a power switch (60) used for controlling whether or not to power the Bluetooth chip, a charging port (62) which is not covered by the wrapping material and supports the battery with continuous power. FIG. 3 depicts a power switch (60) and charging port (62) is on a rear side of the handle (64), but not attached on a high contact portion (66) of the handle. The high contact portion of the handle is the portion which mostly contacts human body when the handbag is used. People will not see the power switch or charging port easily, then it will not affect the bag's beautiful appearance. Also, the switch button will not be switched on/off by accident. Also, not being on the part of handle which mostly contacts the human body, the user will not get hurt or feel uncomfortable when they carry the bag. The mainboard may be further provided with an Led light (68) connected to the Bluetooth chip. The Led light is used for receiving a signal transmitted by the Bluetooth chip and prompting a working state of the incoming call reminding device by blinking. The mainboard may have a Bluetooth chip, a power switch used for controlling whether or not to power the Bluetooth chip and a charging port to support the battery with continue power. There may be at least one opening (70) on the handle that matches a size and a position of the power charging port and the power switch button. The opening offers the power charging port an exit, making the device be available to be charged, and the power switch button easy to be used. The switch button may also be used to activate headphones or earphones which are connected with the mobile phone to answer phone calls.

The mainboard may be further provided with a GPS locator for providing GPS position information to the mainboard and feedback to the mobile phone. The mainboard may be further provided with an alarm for receiving the position information transmitted by the GPS locator, when the position information exceeds a program parameter set up in the alarm, the alarm will be sounded.

Figure 13:
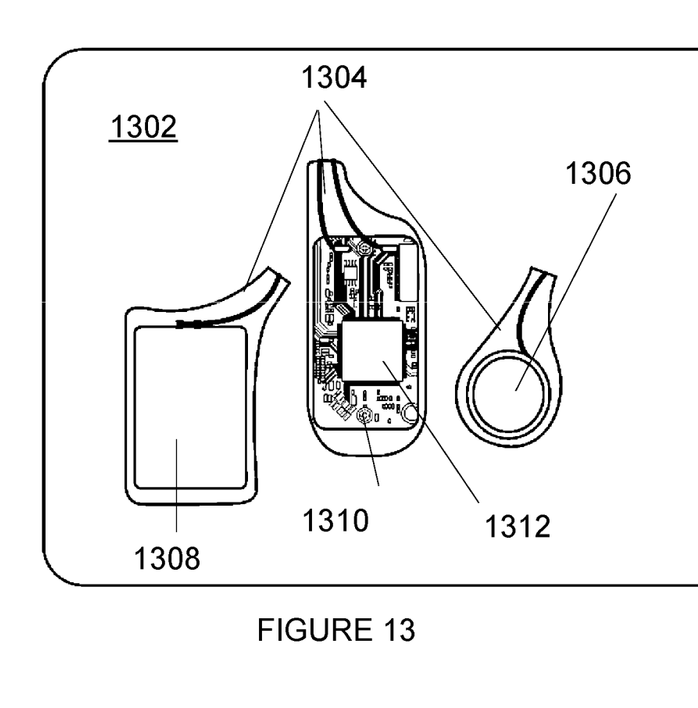
FIG. 13 depicts a holder according to the present invention. is a front view of a back

As shown in FIGS. 1, 2, 3, 5 and 12, wherein the handle or a shoulder strap of the luggage/handbag has an outer surface (501), an inner surface (502) and a layer of base material (1206, 1208) in communication with the inner surface of handle or shoulder strap; wherein the layer of base material holds the mainboard, battery and vibration motor firmly by glue (1202), while the cable (1204) is unglued, and settled inside of the handle, wherein the vibration motor, mainboard and battery are placed separately and substantially in a line (see, for example, FIGS. 12 and 13), to keep in a narrow space inside of the handle; The layer of base material may be selected from the group consisting of plastic board, cardboard, fabric, foaming, leather, synthetic leather, metalboard and silicone. FIG. 13 depicts that there may be a sticky tape (1302) attached to the top of the cavity (1304), the vibration motor (1306), battery (1308) and mainboard (1310) with a Bluetooth chip (1312) therein. This holds the pieces firmly in place and protects the cable inside from being stretched too hard.

Figure 4:
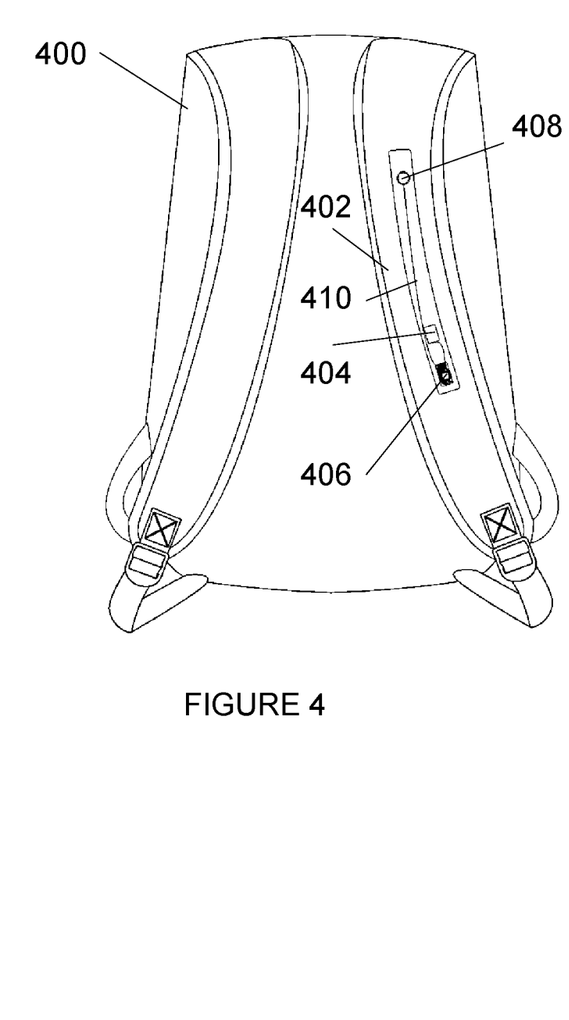
FIG. 4 is a back view of a backpack according to one aspect of the present invention.
Figure 5:
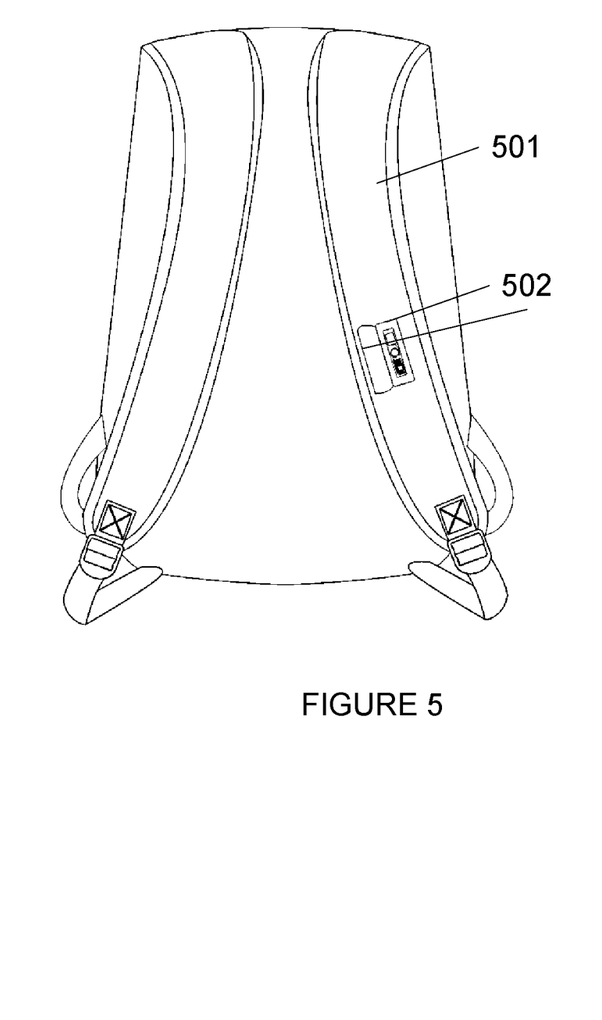
FIG. 5 is a back view of a backpack according to one aspect of the present invention.
Figure 9:
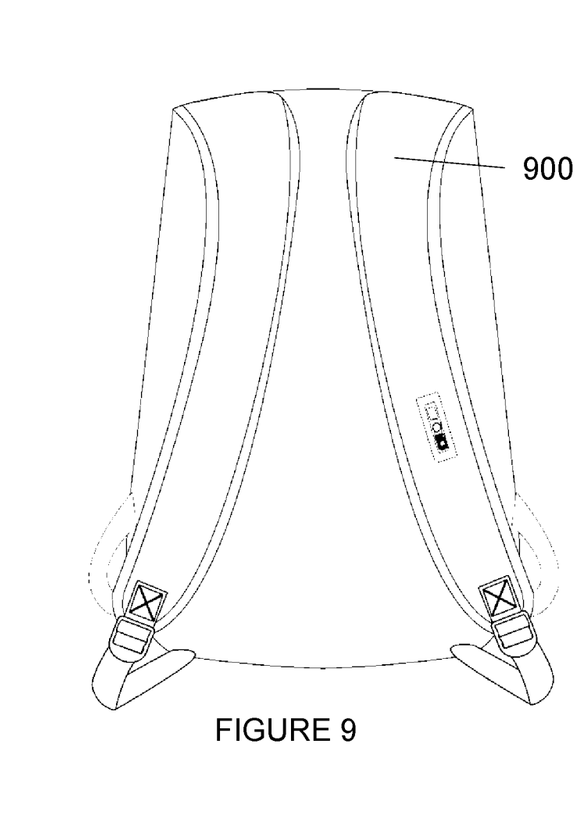
FIG. 9 is a back view of a backpack according to one aspect of the present invention.
Figure 10:
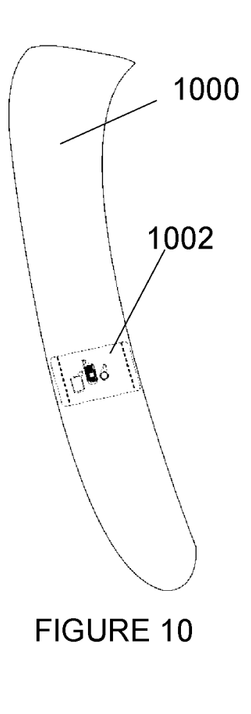
FIG. 10 depicts a shoulder strap of a backpack according to the present invention.
Figure 11:
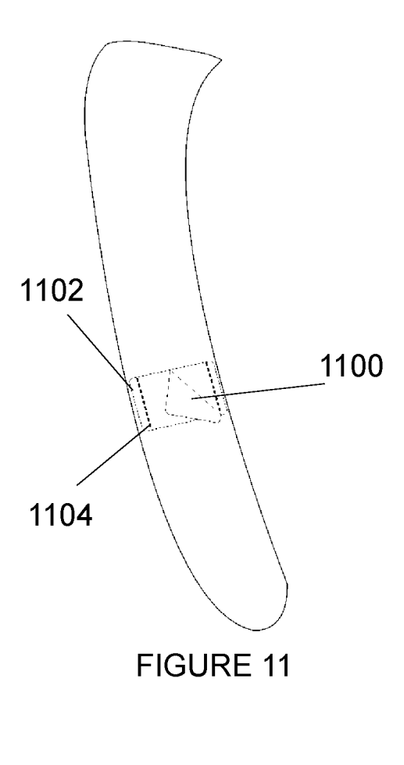
FIG. 11 depicts a shoulder strap of a backpack according to the present invention.
Figure 12:
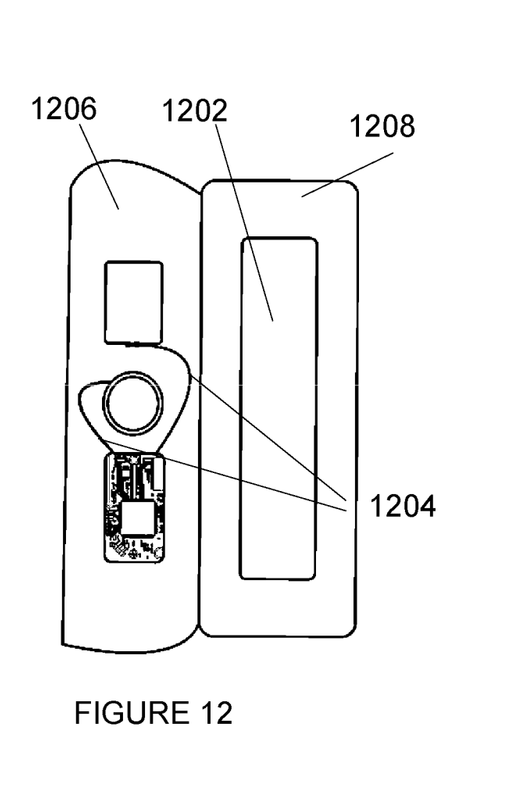
FIG. 12 depicts a holder according to the present invention.

As shown in FIG. 4, a backpack (400) with an incoming call reminding function is depicted, comprising: an incoming call reminding device equipped inside a shoulder strap (402) of the backpack and used for sensing an incoming call signal of a mobile phone nearby, and achieving a reminding effect by vibrating; wherein the incoming call reminding device comprises: a battery (404) used for supplying power to a mainboard (406). The mainboard is used for sensing the incoming call signal of the mobile phone and causing a vibration motor (408) to vibrate to make an incoming call reminder. There may be at least one cable (410) used for connecting the mainboard to the vibration motor and the battery, wherein the vibration motor receives the signal transmitted by the mainboard and vibrates to alert when the mobile phone (which may be in the backpack or nearby) has an incoming call. As shown in FIGS. 9, 10 and 11. The shoulder strap of the backpack has an outer surface (900) and an inner surface (1000), and a holder (1002) that communicates with the inner surface (1002). The holder may have a thickness of at least 0.5 mm. The holder may gave at least two cavities to hold the incoming call reminding device inside of the shoulder strap. The power switch and the charging port are on the front side of the shoulder strap. The terms front side of the shoulder strap and outer surface of the shoulder strap are interchangeable. Then the switch button will not be switched on/off by accident and it is not on the part that mostly contacts the human body and the user will not get hurt or feel uncomfortable when they carry the backpack.

As shown in FIG. 11, a tape (1100) adheres the entire device to the holder (1102), to immobilize the vibration motor, battery and mainboard, allowing the entire device to bend flexibly. The incoming call reminding device may be attached by glue inside a shoulder strap of the backpack, but the cable stays unglued in the cavity. The mainboard may be further provided with an Led light connected to the Bluetooth chip. The Led light is used for receiving a signal transmitted by the Bluetooth chip and prompting a working state of the incoming call reminding device by blinking. The mainboard may be further provided with a GPS locator for providing GPS position information to the microcontroller. The mainboard may be further provided with an alarm for receiving the position information transmitted by the GPS locator, when the position information exceeds a program parameter set up in the alarm, the alarm will be given. There may be at least one opening on the handle or shoulder strap matches a size and a position of the power charging port and the power switch button. The holder may be attached to the shoulder strap by stitching (1104).

As shown in FIGS. 6, 7 and 8, there may be a luggage/handbag with an incoming call reminding function, comprising: an incoming call reminding device equipped inside a handle or a shoulder strap of the luggage/handbag and used for sensing an incoming call signal of a mobile phone nearby, and achieving a reminding effect by vibrating, wherein the incoming call reminding device comprises: a battery used for supplying power to a mainboard; a mainboard used for sensing the incoming call signal of the mobile phone in the luggage/handbag and causing a vibration motor to vibrate to make an incoming call reminder, at least one cable used for connecting the mainboard to the vibration motor and the battery, wherein the vibration motor receives the signal transmitted by the mainboard and vibrates to alert when the mobile phone in the luggage/bag has an incoming call, The vibration motor may be located away from the mainboard and stay in the cavity located at the end which is near the top of the handle; wherein the mainboard is located at the lower area, while the vibration motor is at the opposite end, but connected by a length of cable in the cavity. The distance between the mainboard, vibration motor and battery may be at least 1 mm, wherein the length of cable is longer than 2 mm, offers a loose space, allowing the vibration motor, mainboard and battery to bend flexibly. The longer length of cable offers a loose space, allowing the vibration motor, battery and mainboard to bend flexibly when user carrying the handbag/luggage. The mainboard may have a Bluetooth chip, a power switch used for controlling whether or not to power the Bluetooth chip, and a charging port to support the battery with continue power. The switch button may also be used to activate headphones/earphones which connect with the mobile phone to answer phone calls. The power switch and the charging port may be on the rear side (64) of handle, but not attached on a high contact part of the handle. The mainboard may be further provided with an Led light connected to the Bluetooth chip. The Led light may be used for receiving a signal transmitted by the Bluetooth chip and prompting a working state of the incoming call reminding device by blinking. The mainboard may be further provided with a GPS locator for providing GPS position information to the microcontroller. The mainboard may be further provided with an alarm for receiving the position information transmitted by the GPS locator, when the position information exceeds a program parameter set up in the alarm, the alarm will be given. There may be at least one opening on the handle matching a size and a position of the power charging port and the power switch button, offering the power charging port an exit, allowing the device be available to be charged, and the power switch button to be easily used. The invention overcomes the shortcomings of the existing luggage/bag not having the incoming call reminding function, which has an excellent incoming call reminding function without affecting the appearance of the luggage/bag, and is convenient to use.

The luggage/bag with an incoming call reminding function according to the present invention is not limited to the above embodiments, and any improvement or substitution in accordance with the principles of the present invention is intended to be within the protection scope of the present invention.

I claim:

1. A handbag with an incoming call reminding function, comprising:
    an incoming call reminding device equipped inside a handle of the handbag and used for sensing an incoming call signal of a mobile phone nearby and reminding by vibrating;
    wherein the incoming call reminding device comprises:
    a mainboard used for sensing the incoming call signal of the mobile phone and causing a vibration motor to vibrate to make an incoming call reminder,
    a battery used for supplying power to the mainboard and vibration motor;
    at least one cable used for connecting the mainboard to the vibration motor and the battery,
    wherein the vibration motor receives the signal transmitted by the mainboard and vibrates to alert when the mobile phone has an incoming call;
    wherein the handle of the handbag has an outer surface wrapping an inner padding material, the inner padding material having at least one cavity to hold the incoming call reminding device inside of the handle;
    wherein the vibration motor, the mainboard and the battery are placed separately and substantially in a line, to keep in a narrow space inside of the handle;
    wherein the vibration motor is located away from the mainboard and stays in the cavity located at the end which is near the top end of the handle;
    wherein the mainboard and the battery are located at the lower area, while the vibration motor is at the opposite end, but connected by a length of cable in the cavity;

wherein a tape adheres the device to the holder, to immobilize the vibration motor, the battery and the mainboard, allowing the device to bend flexibly.

2. The handbag with an incoming call reminding function according to claim 1, wherein the mainboard comprises a Bluetooth chip, a power switch used for controlling whether or not to power the Bluetooth chip, a charging port which is not covered by the wrapping material and supports the battery with continuous power.

3. The handbag with an incoming call reminding function according to claim 1, wherein the incoming call reminding device is attached inside the handle of the handbag by glue, but the cable stays unglued in the cavity.

4. The handbag with an incoming call reminding function according to claim 1, further comprising a sticky tape attached to the top of the cavity, the vibration motor, battery and the mainboard.

5. The handbag with an incoming call reminding function according to claim 1, wherein the switch button is also be used to activate headphones/earphones which connect with the mobile phone to answer phone calls.

6. The handbag with an incoming call reminding function according to claim 1, wherein the power switch and charging port is on the rear side of the handle, but not attached on a high contact portion of the handle.

7. The handbag with an incoming call reminding function according to claim 2, wherein the mainboard is further provided with an Led light connected to the Bluetooth chip.

8. The handbag with an incoming call reminding function according to claim 2, wherein the mainboard is further provided with a GPS locator for providing GPS position information to the mainboard and feedback to the mobile phone.

9. The handbag with an incoming call reminding function according to claim 6, wherein the mainboard is further provided with an alarm for receiving the position information transmitted by the GPS locator, when the position information exceeds a program parameter set up in the alarm, the alarm will be sounded.

10. The handbag with an incoming call reminding function according to claim 1, further comprising at least one opening on the handle that matches a size and a position of the power charging port and the power switch button.

11. A backpack with an incoming call reminding function, comprising:
an incoming call reminding device equipped inside a shoulder strap of the backpack and used for sensing an incoming call signal of a mobile phone nearby, and achieving a reminding effect by vibrating;
wherein the incoming call reminding device comprises:
a mainboard used for sensing the incoming call signal of the mobile phone and causing a vibration motor to vibrate to make an incoming call reminder,
a battery used for supplying power to the mainboard;
at least one cable used for connecting the mainboard to the vibration motor and the battery, wherein the vibration motor receives the signal transmitted by the mainboard and vibrates to alert when the mobile phone has an incoming call,
wherein the shoulder strap of the backpack has an outer surface and inner surface, and a holder that communicates with the inner surface,
wherein the holder has at least two cavities to hold the incoming call reminding device inside of the shoulder strap; wherein a tape adheres the device to the holder, to immobilize the vibration motor, the battery and the mainboard, allowing the device to bend flexibly.

12. The backpack with an incoming call reminding function according to claim 11, wherein the mainboard comprise a Bluetooth chip, a power switch used for controlling whether or not to power the Bluetooth chip, a charging port to support the battery with continue power.

13. The backpack with an incoming call reminding function according to claim 11, wherein the incoming call reminding device is attached by glue inside a shoulder strap of the backpack, but the cable stays unglued in the cavity.

14. The backpack with an incoming call reminding function according to claim 11, wherein the switch button is also used to activate headphones/earphones which are connected with the mobile phone to answer phone calls.

15. The backpack with an incoming call reminding function according to claim 11, wherein the power switch and the charging port are on the front side of the shoulder strap.

16. The backpack with an incoming call reminding function according to claim 13, wherein said mainboard is further provided with an Led light connected to the Bluetooth chip.

17. The backpack with an incoming call reminding function according to claim 13, wherein the mainboard is further provided with a GPS locator for providing GPS position information to the microcontroller.

18. The backpack with an incoming call reminding function according to claim 13, wherein the mainboard is further provided with an alarm for receiving the position information transmitted by the GPS locator, when the position information exceeds a program parameter set up in the alarm, the alarm will be given.

19. The backpack with an incoming call reminding function according to claim 11, wherein at least one opening on the handle or shoulder strap matches a size and a position of the power charging port and the power switch button.

20. The backpack with an incoming call reminding function according to claim 11, wherein the holder is attached to the shoulder strap by stitching.

21. A luggage/handbag with an incoming call reminding function, comprising: an incoming call reminding device equipped inside a handle or a shoulder strap of the luggage/handbag and used for sensing an incoming call signal of a mobile phone nearby, and achieving a reminding effect by vibrating;
wherein the incoming call reminding device comprises:
a mainboard used for sensing the incoming call signal of the mobile phone and causing a vibration motor to vibrate to make an incoming call reminder,
a battery used for supplying power to the mainboard;
at least one cable used for connecting the mainboard to the vibration motor and the battery,
wherein the vibration motor receives the signal transmitted by the mainboard and vibrates to alert when the mobile phone has an incoming call,
wherein the handle or a shoulder strap of the luggage/handbag has an outer surface, an inner surface and a layer of base material in communication with the inner surface;
wherein the layer of base material holds the mainboard, battery and vibration motor firmly by glue, while the cable is unglued, and settled inside of the handle,
wherein the vibration motor, the mainboard and battery are placed separately and substantially in a line, to keep in a narrow space inside of the handle;
wherein the vibration motor is located away from the mainboard and stays in a cavity located at the end which is near the top of the handle;

wherein the mainboard is located at the lower area, while the vibration motor is at the opposite end, but connected by a length of cable in the cavity; wherein a tape adheres the device to the holder, to immobilize the vibration motor, the battery and the mainboard, allowing the device to bend flexibly.

22. The luggage/handbag with an incoming call reminding function according to claim 21, wherein the layer of base material is selected from the group consisting of plastic board, cardboard, fabric, foaming, leather, synthetic leather, metal board and silicone.

23. The luggage/handbag with an incoming call reminding function according to claim 21, wherein the mainboard comprises a Bluetooth chip, a power switch used for controlling whether or not to power the Bluetooth chip, and a charging port to support the battery with continue power.

24. The luggage/handbag with an incoming call reminding function according to claim 21, wherein the switch button is also used to activate headphones/earphones which connect with the mobile phone to answer phone calls.

25. The luggage/handbag with an incoming call reminding function according to claim 21, wherein the power switch and the charging port are on the rear side of handle, but not attached on a high contact part of the handle.

26. The luggage/handbag with an incoming call reminding function according to claim 23, wherein the mainboard is further provided with an Led light connected to the Bluetooth chip.

27. The luggage/handbag with an incoming call reminding function according to claim 23, wherein the mainboard is further provided with a GPS locator for providing GPS position information to the microcontroller.

28. The luggage/handbag with an incoming call reminding function according to claim 23, wherein the mainboard is further provided with an alarm for receiving the position information transmitted by the GPS locator, when the position information exceeds a program parameter set up in the alarm, the alarm will be given.

29. The luggage/handbag with an incoming call reminding function according to claim 21, further comprising at least one opening on the handle matching a size and a position of the power charging port and the power switch button.

\* \* \* \* \*